Sept. 6, 1932.  G. A. MITCHELL  1,875,751
PHOTOGRAPHIC PRINTING
Filed March 13, 1929  2 Sheets-Sheet 1
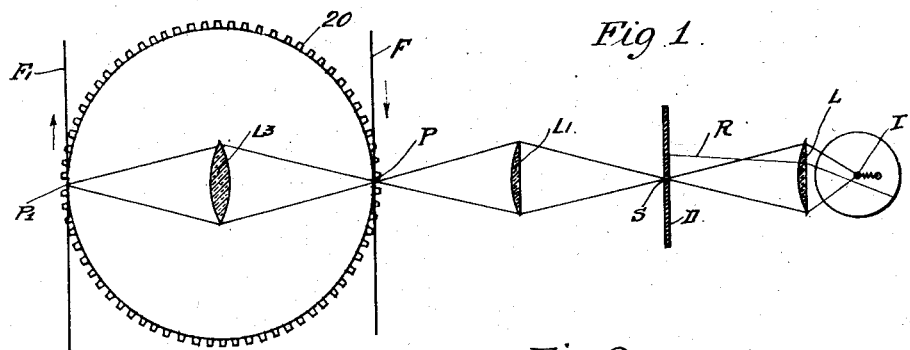
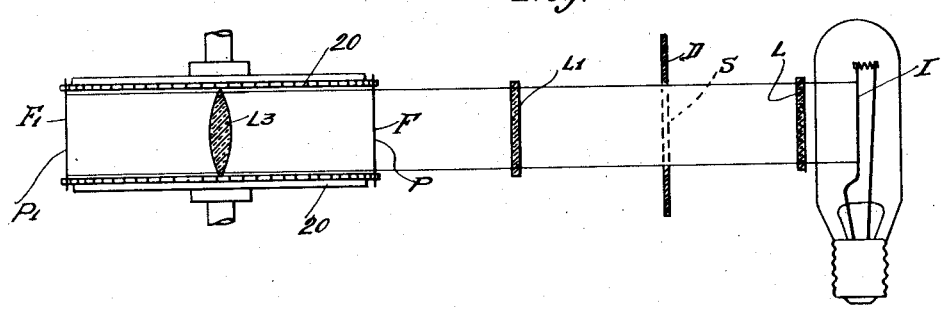
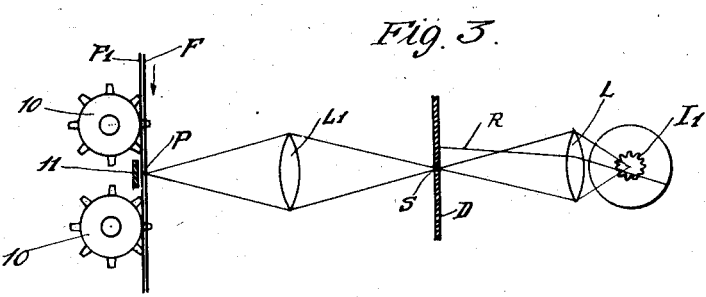
Inventor.
George A. Mitchell
Attorney.

Patented Sept. 6, 1932

1,875,751

UNITED STATES PATENT OFFICE

GEORGE A. MITCHELL, OF LOS ANGELES, CALIFORNIA, ASSIGNOR TO MITCHELL CAMERA CORPORATION, A CORPORATION OF DELAWARE

PHOTOGRAPHIC PRINTING

Application filed March 13, 1929. Serial No. 346,647.

This invention has to do with photographic printing and, although not limited necessarily to the printing of motion picture film, the invention has been particularly designed to overcome certain difficulties inherent in motion picture printing, and will therefore be explained in that connection.

In both types of motion picture printers as now in use—contact printers and projection printers—difficulties are encountered due to what is known as film slippage. For instance, in a common type of contact printer the two films, say a developed negative and a fresh positive, are fed through the printer by a sprocket mechanism or a claw mechanism. The two films may be fed by one and the same feed mechanism, or may be fed by separate coordinating mechanisms. In either case, due either to inaccuracies in the movements or due to differences in the manners in which the two films engage the one or two movements, or due to both, the films may not be fed forward at exactly equal or unvarying speeds or through exactly equal distances. If the film movement is continuous, one film may be at times fed ahead somewhat faster than the other; and at other times somewhat more slowly. For instance, such discrepancy in speed advancement may easily be due to the two films engaging the feed sprocket or sprockets a little differently from each other. The principal difficulties now encountered with continuous printers are caused by unequal linear pitch of negative and positive due to different shrinkages, and by the difference in length of path through the printer due to the outer film on a sprocket having a larger radius of its path. In such cases the developed image of the resultant positive will, of course, be distorted; and such irregularities of film movement not only distort the printer images but may also irregularly distort "frames" on the printed film; so that, in addition to having indistinct images, the images on successive frames may not be in exactly corresponding positions.

It is a major object of this invention to provide a system of printing—to provide a printing method and apparatus—that will overcome the difficulties herein described and that will reduce the distortion of the printed image to an amount less than a certain predetermined or selected amount, more or less regardless of irregularities or irregularities in the film movements. Generally speaking, this object is accomplished by printing only on a line or very narrow band of illumination rather than printing over a broad surface of illumination. By so controlling the line of illumination that its width is not greater than, or preferably less than, the maximum permissible distortion (and the line width in practice can easily be made much less than is the present distortion due to irregularity of film movement) a print is obtained which, to all practical purposes and intents is distortionless and is perfectly clear and sharp. Clarity and sharpness of print is very highly desirable in motion pictures for many reasons, but perhaps mainly for the first reason that motion picture film is very largely magnified in projection, and for the second reason that projection positive is usually the result of several successive printings from film to film, and that the distortions of those successive printings are, in some degree at least, cumulative.

In the accompanying drawings I illustrate diagrammatically typical and illustrative optical systems and the disgrammatic essentials of apparatus for carrying out my system of printing. In these drawings Figure 1 is a diagram in elevation showing one form of system.

Fig. 2 is a diagram of the same in plan.

Fig. 3 is a diagram in elevation showing a modified form of system.

Figure 4:
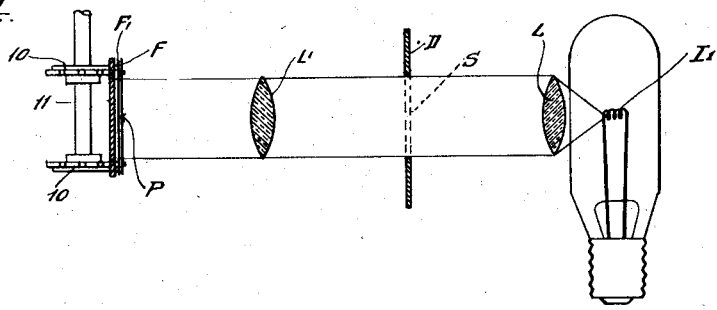
Fig. 4 is a similar diagram showing the same in plan.

Referring first to Figures 1 and 2, F represents a film from which a print is being taken and F1 represents a film being printed. Any suitable means may be used for moving the two films in synchronism through the apparatus; and in my system the films are preferably, although not necessarily, moved at uniform speed rather than non-uniformly or discontinuously. The mechanism or mechanisms for moving the two films through the printer will, of course, preferably be so designed and made that the two films are moved at speeds as nearly as possible equal and uniform. The particular film moving mechanism, or its specific details form no part of my present invention. As a matter of preference I show such an arrangement that the printing from one film to the other is done by projection rather than by contact. In these figures the straight line filament I is a source of illumination and the lens L casts a straight line image of filament I to a line of commensurate width located at the point indicated at P in Figures 1 and 2, and located in the plane of the film F from which a print is being made—preferably located in the plane of the photographic image carried by that film. Film F is shown as being constantly moved in one direction while the fresh film F1 is shown as being spaced from film F and constantly moved in the opposite direction. This may be done by such printer mechanism as is shown in my patent entitled Printer No. 1,584,185, May 11, 1926. The diagrammatic representation in Figures 1 and 2 involves a sprocket or sprockets 20 large enough to feed film F at one side and film F1 at the other side, a suitable spherical lens L3 being centrally located so as to throw the image of the line of light at P onto the emulsion plane of film F1 at the line position indicated at P1. The line image at P1 will, of course, be a duplicate of the line image at P, except that it is reversed; and, without the necessity of any further explanation, it will be seen how the printing from film F to film F1, with film F1 moving oppositely to film F, is subject to the same conditions as is the printing which will be described in connection with Figures 3 and 4.

As shown in Figures 1 and 2 the source of illumination I is preferably in the form of a linear incandescent filament I of comparatively small diameter. A cylindric lens L projects an image of the incandescent filament I upon a slot S in a diaphragm D. The arrangement is such that filament I extends horizontally (in a plane at right angles to the movement of films F and F1), and slot S is also horizontal; and such that all of the light from filament I which falls upon cylindric lens L is concentrated in a filament image at the diaphragm slot S. The rays of light which form that image at the diaphragm slot pass on to another cylindric lens L1, which lens again forms an image of the incandescent filament I, or of the diaphragm slot, in a horizontal line whose position is indicated at P, in the focal or printing plane of the film F.

By this arrangement it will be seen that a line of light of narrow width and of comparatively intense illumination is concentrated on the printing or focal planes of the films. That line of light extends horizontally across the width of the films (perpendicular to their line of travel) and, within any reasonable limits, may be made as narrow (as small in vertical dimension) as may be desired. For instance, it is perfectly practicable to make the width of diaphragm slot S about 0.002 of an inch, or less. The filament I is preferably of commensuate diameter. For instance, if filament I and diaphragm slot S are at about the relative distances from lens L that are illustrated in the drawings, then if the diameter of the filament I is about 0.001 inch, the image of the filament at S will be approximately the full width of the slot. It may be desirable either to make the filament a little larger or to so arrange the relative optical distances that the filament image at S overlaps the slot edge slightly. By so doing, it is insured that the entire diaphragm slot will be filled with the filament image—will be filled with concentrated light rays—and thus a perfectly uniform line of light is provided whose image is cast upon the films. I think it preferable to rectify the filament image by the use of the accurately machined diaphragm slot, so that the width dimension of the line of light—the dimension in the direction lengthwise of the films—shall be perfectly uniform. The slotted diaphragm also insures that no secondary rays—such as illustrated at R as being reflected from the filament enclosing bulb—shall reach the film, and thus insures that there be no "halo" of light around the slot image and that printing shall be sharp and clear.

In the forms shown in Figures 1 and 2, 3 and 4, the diaphragm slot may be looked at as the source of light for the system. Where such a diaphragm slot is used it is theoretically immaterial, as will be apparent, just what kind of primary illumination is used for filling the slot with light. Practical and economic considerations make it desirable that the primary light source be also a line of light so that all or substantially all of the available light from the primary source can be thrown upon the diaphragm slot and thence upon the films. Thus, preferably, a linear filament and a cylindric lens L are used; but it will be readily understood that, theoretically at least, any suitable primary light source, and any suitable condenser—or even no condenser at all—may be used, just so long as the slot S is flooded with light. And, likewise, where a linear filament is used, lens L is not necessarily a cylindric lens but may be a lens of any character that will concentrate a line image on diaphragm slot S; and, also, lens L1 is not necessarily a cylindric lens, but may be any kind of lens that will concentrate a second image in a single narrow line upon the printing plane of the films.

Whatever may be the specific details of the optical arrangements, it will be seen that two films F and F1 are moved longitudinally through a plane or planes wherein there is a narrow transverse line of illumination. In the illustrations here given the width of this illumination line, the dimension in the direction of film movement, is about 0.002 inch. This line of illumination preferably extends squarely or approximately squarely, across the line of film movement, although not necessarily so. The line of illumination may extend at an oblique angle across the films, but in that case the dimension of the line of illumination in the direction of film movement would be something more than the normal transverse dimension of slot S or its image. Thus, in any case, the film moves through a very narrow line or band of illumination whose dimension in the direction of film movement is at least no more, and is preferably less, than the permissible image distortion allowable for best results in the finished print. Actual printing can take place at any instant only in that limited line area; and in case there is any relative slippage between the two films, the image distortion or "smudging" in a direction longitudinal of the films and is limited entirely to the narrow dimension of the illumination line.

I have indicated that the diaphragm slot S, although desirable, is not necessary in the broader aspects of my invention; that the primary light source need not necessarily be a single line; that the films may be carried through the printer by any suitable mechanism; and that the lenses L and L1 need not be cylindric. To illustrate such variations I have shown in Figures 3 and 4 diagrams of the printing system equipped with such means for feeding the films that the films F and F1 are moved through the printer by one set of sprockets 10. In Figure 3 the films are thus moved together longitudinally, as in the direction indicated by the arrow. At 11 is indicated a suitable backing plate or other member over which the films are moved and which will facilitate an accurate positioning of the films (or of their face to face emulsions) in the focal plane of the printing system.

In Figures 3 and 4 the lenses L and L1 are shown as spherical; it will be understood how they act without further explanation; and also how the concentrated filament light L1 may be used as shown.

Figure 5:
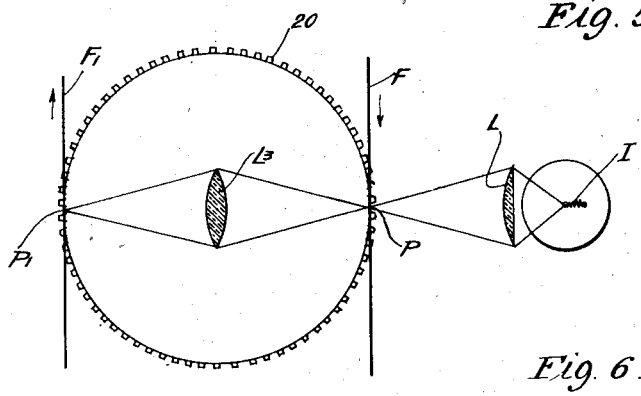
Fig. 5 is a diagram in elevation showing a further modification.
Figure 6:
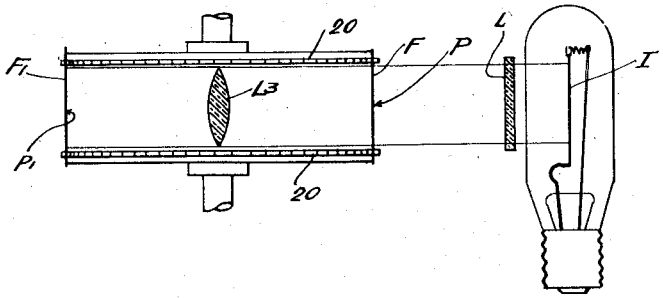
Fig. 6 is a diagram showing the same in plan.

To indicate further variations, in the form of Figures 5 and 6 the elimination of the diaphragm and slot is illustrated. Preferably where, as in Figures 5 and 6 a diaphragm slot is not used, the source of illumination I will be a straight line filament of uniform width and illumination and as straight as possible. Slight variations from straightness of filament I, and therefore of line images at P and P1 may be of no particular consequence, so long as the crookedness of the filament is not sufficient materially to increase locally the dimension of the image at P or P1 in the direction of film movement; but, of course, it is preferable in actual practice to have the filament or other source of light and the image at P as straight as may be.

In the form of Figures 5 and 6 the transverse dimension of the illumination line is, of course, more or less dependent upon the transverse dimension of the original light source. The transverse dimension of the line at P or P1 can, of course, be made smaller by moving lens L closer to P and further away from I; but such disposal of the lens entails relative loss of light in the system. It is, however, entirely practicable to use the filament I of small enough transverse dimension to give the desired results and at the same time maintain good light efficiency. In the form shown in Figures 1 and 2 the transverse dimension of the line of illumination at P does not necessarily depend upon the transverse dimension of filament I, but can be reduced to any desired size by proper dimensioning of slot S.

It will be understood that where herein I refer to photographic films I mean to include all forms of photographic plates, prints etc., not using the term in its restricted sense of flexible transparent celluloid film.

I claim:

1. Apparatus for printing photographic film, embodying means for moving two films in photographic printing relation one to the other, a linear light slit extending in a direction transverse to the direction of movement of the film from which the print is being taken, means for illuminating the light slit, and a cylindric lens disposed with the axis of its cylindric surface parallel to said linear light slit and arranged to cast transversely across the film from which the print is being taken a laterally compressed image of said linear light slit.

2. Apparatus for printing photographic film, embodying means for moving two films in photographic printing relation one to the other, a linear light slit extending in a direction transverse to the direction of movement of the film from which the print is being taken, means for illuminating the light slit, said means including a linear light source and a cylindric lens arranged to cast a laterally compressed image of the linear light source on the linear slit, and a cylindric lens disposed with the axis of its cylindric surface parallel to said linear light slit and arranged to cast transversely across the film from which the print is being taken a laterally compressed image of said linear light slit.

In witness that I claim the foregoing I have hereunto subscribed my name this 8th day of March, 1929.

GEORGE A. MITCHELL.